(12) United States Patent
Kraemer et al.

(10) Patent No.: US 8,316,647 B2
(45) Date of Patent: Nov. 27, 2012

(54) SYSTEM AND METHOD EMPLOYING CATALYTIC REACTOR COATINGS

(75) Inventors: Gilbert Otto Kraemer, Greer, SC (US); Cristina Colindres Kraemer, Greer, SC (US)

(73) Assignee: General Electric Company, Schenectady, NY (US)

( * ) Notice: Subject to any disclaimer, the term of this patent is extended or adjusted under 35 U.S.C. 154(b) by 729 days.

(21) Appl. No.: 12/356,058

(22) Filed: Jan. 19, 2009

(65) Prior Publication Data

US 2010/0180597 A1 Jul. 22, 2010

(51) Int. Cl.
*F02C 7/26* (2006.01)

(52) U.S. Cl. ............ 60/777; 60/39.822; 60/723; 431/2; 431/3; 431/7; 427/154; 427/155; 427/156; 427/454; 427/419.2; 427/419.8; 423/239.1; 423/243.01; 423/244.01

(58) Field of Classification Search ............... 60/39.822, 60/723, 777; 431/2, 3, 7, 170; 122/40; 134/123, 134/169 R; 427/454, 156, 419.2, 419.8; 423/329.1, 243.01, 244.01
See application file for complete search history.

(56) References Cited

U.S. PATENT DOCUMENTS

| | | | | |
|---|---|---|---|---|
| 3,830,756 A | * | 8/1974 | Sanchez et al. | 502/304 |
| 4,254,739 A | * | 3/1981 | Enga | 122/4 D |
| 4,276,203 A | * | 6/1981 | Pfefferle | 502/303 |
| 4,415,537 A | * | 11/1983 | Vine et al. | 422/180 |
| 4,534,165 A | | 8/1985 | Davis, Jr. et al. | |
| 4,643,667 A | * | 2/1987 | Fleming | 431/7 |
| 4,794,753 A | | 1/1989 | Beebe | |
| 4,857,499 A | * | 8/1989 | Ito et al. | 502/326 |
| 4,966,001 A | | 10/1990 | Beebe | |
| 5,026,273 A | * | 6/1991 | Cornelison | 431/170 |
| 5,102,850 A | * | 4/1992 | Sanchez et al. | 502/261 |
| 5,143,949 A | * | 9/1992 | Grogan et al. | 523/334 |
| 5,235,804 A | | 8/1993 | Colket, III et al. | |
| 5,248,251 A | * | 9/1993 | Dalla Betta et al. | 431/7 |
| 5,355,668 A | | 10/1994 | Weil et al. | |
| 5,460,002 A | * | 10/1995 | Correa | 60/723 |
| 5,721,188 A | * | 2/1998 | Sung et al. | 502/439 |
| 5,873,500 A | * | 2/1999 | Homburg et al. | 222/608 |
| 5,891,584 A | | 4/1999 | Coffinberry | |
| 6,155,819 A | | 12/2000 | Etemad et al. | |
| 6,174,159 B1 | | 1/2001 | Smith et al. | |
| 6,286,298 B1 | | 9/2001 | Burrus et al. | |
| 6,358,040 B1 | | 3/2002 | Pfefferle et al. | |
| 6,358,879 B1 | * | 3/2002 | Pfefferle et al. | 502/302 |

(Continued)

FOREIGN PATENT DOCUMENTS

EP 1519116 3/2005

(Continued)

OTHER PUBLICATIONS

Staudt, J., "Status Report on NOx Controls for Gas Turbines Cement Kilns Industrial Boilers Internal Combustion Engines." Technologies & Cost Effectiveness. (Dec. 2000): 1-219.

(Continued)

*Primary Examiner* — Ehud Gartenberg
*Assistant Examiner* — Michael B Mantyla
(74) *Attorney, Agent, or Firm* — Fletcher Yoder, P.C.

(57) ABSTRACT

Methods and apparatuses are provided for protecting a catalyst within a combustor. In one embodiment, a catalytic reactor includes a protective coating that may be chemically removed or mechanically removed while the catalytic reactor is disposed in a combustor.

21 Claims, 5 Drawing Sheets

U.S. PATENT DOCUMENTS

| | | | |
|---|---|---|---|
| 6,394,791 B2 | 5/2002 | Smith et al. | |
| 6,460,345 B1 | 10/2002 | Beebe et al. | |
| 6,588,213 B2 * | 7/2003 | Newbury | 60/777 |
| 6,748,745 B2 | 6/2004 | Ul Karim et al. | |
| 6,752,623 B2 | 6/2004 | Smith et al. | |
| 6,925,811 B2 | 8/2005 | Justis et al. | |
| 7,003,958 B2 | 2/2006 | Dinu et al. | |
| 7,003,959 B2 | 2/2006 | Ackermann et al. | |
| 7,007,478 B2 | 3/2006 | Dinu | |
| 7,093,438 B2 | 8/2006 | Dinu et al. | |
| 7,093,445 B2 | 8/2006 | Corr, II et al. | |
| 7,208,230 B2 | 4/2007 | Ackermann et al. | |
| 7,278,265 B2 * | 10/2007 | Alvin et al. | 60/723 |
| 7,332,143 B2 * | 2/2008 | Symrniotis et al. | 423/239.1 |
| 7,531,479 B2 * | 5/2009 | Burns et al. | 502/302 |
| 2003/0056520 A1 * | 3/2003 | Campbell et al. | 60/777 |
| 2007/0037105 A1 | 2/2007 | Pfefferle et al. | |
| 2008/0003155 A1 * | 1/2008 | Jia et al. | 423/213.5 |
| 2008/0282843 A1 * | 11/2008 | Holgersen | 75/403 |

FOREIGN PATENT DOCUMENTS

| | | |
|---|---|---|
| EP | 1320705 | 5/2008 |
| WO | WO 03/072919 | 9/2003 |
| WO | WO 2004/099668 | 11/2004 |
| WO | WO 2005/026675 | 3/2005 |

OTHER PUBLICATIONS

Illinois Environmental Protection Agency, "Technical Support Document for Controlling NOx Emissions from Stationary Reciprocating Internal Combusion Engines and Turbines." AQPSTR 07-01. (2007): 1-85.

"Alternative Control Techniques Document—NOx Emissions from Stationary Gas Turnines." Emission Standards Division. (1993): 1-399.

Baird, Benjamin. "Ultra Low NOx Using Rich Catalytic/Lean-Burn Catalytic Pilots: Gas Turbine Engine Test." Proceedings of ASME Turbo Expo 2009: Power for Land, Sea and Air. (2008): 1-9.

Etemad, S., "Ultra Low NOx Catalytic Combustion for IGCC Power Plants." Phase II Final Technical Report. (2008): 1-22.

Schilke, P.W. "Advanced Gas Turbine Materials and Coatings." (Aug. 2004): 1-30.

Smith, L.L. "Rich-Catalytic Lean-burn Combustion for Fuel-Flexible Operation with Ultra Low Emissions." ScienceDirect. 117. (2006): 438-446.

Smith, Lance. "Topical Report." Ultra Low NOx Catalytic Combustion for IGCC Power Plants. (Mar. 2004): 1-24.

Laster, W.R. "Catalytic Combustor for Fuel-Flexible Turbine." Technical Progress Report, Oct. 2005 through Mar. 2006. (2006): 1-34.

Laster, W.R. "Catalytic Combustor for Fuel-Flexible Turbine." Technical Progress Report, Apr. 2005 through Sep. 2005. (2005): 1-20.

Laster, W.R. "Development of a Catalytic Combustor for Fuel Flexible Turbines." Siemens Westinghouse Power Corporation. (2005): 1-10.

Richani, Brahim. "Support for Elimination of Oxidation Catalyst Requirements for GE PG7241FA DLN Combustion Turbines." (Aug. 2001): 1-10.

Schorr, Marvin. "Gas Turbine NOx Emissions Approaching Zero—Is it Worth the Price?." GER 4172. (Sep. 1999): 1-12.

Kaufman, Eric. "Considerations When Burning Ash-Bearing Fuels in Heavy-Duty Gas Turbines." GER-3764A. (Aug. 1996): 1-40.

Rao, A.D. "Systems Analyses of Advanced Brayton Cycles for High Efficiency Zero Emission Plants." Final Report. (Dec. 2008): 1-570.

Badeer, G.H. "GE Aeroderivative Gas Turbines—Design and Operating Features." GER-3695E. (2000): 1-24.

Major, Bill. "Cost Analysis of NOx Control Alternatives for Stationary Gas Turbines." Onsite Sycom Energy Corporation. (Nov. 1999): 1-54.

* cited by examiner

SYSTEM AND METHOD EMPLOYING CATALYTIC REACTOR COATINGS

BACKGROUND OF THE INVENTION

The subject matter disclosed herein relates to catalytic reactors and more specifically, to sacrificial coatings that may be employed within catalytic reactors.

Catalytic reactors may be generally used within combustion processes, for example within gas turbine engines or catalytic reformers, to reduce emissions created during combustion. During combustion, compounds such as nitric oxide and nitrogen dioxide (collectively known as NOx) may be formed at high temperatures, for example, temperatures exceeding approximately 1430° C. Catalytic reactors may employ catalysts that lower the reaction temperatures for combustion, thereby reducing formation of these compounds. During certain combustion operations, it may be desirable to protect the catalysts within the catalytic reactors.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a combustor and a catalytic reactor comprising a protective coating to inhibit fouling of a catalyst during combustion. The protective coating is chemically or mechanically removable while the catalytic reactor is disposed in the combustor.

In a second embodiment, a method includes operating a combustor and removing a protective coating to reveal a catalyst within a catalytic reactor of the combustor while the catalytic reactor is disposed within the combustor.

In a third embodiment, a method includes applying a protective coating over a catalyst coating within a catalytic reactor, wherein the protective coating is configured to be removed while the catalytic reactor is disposed within a combustor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
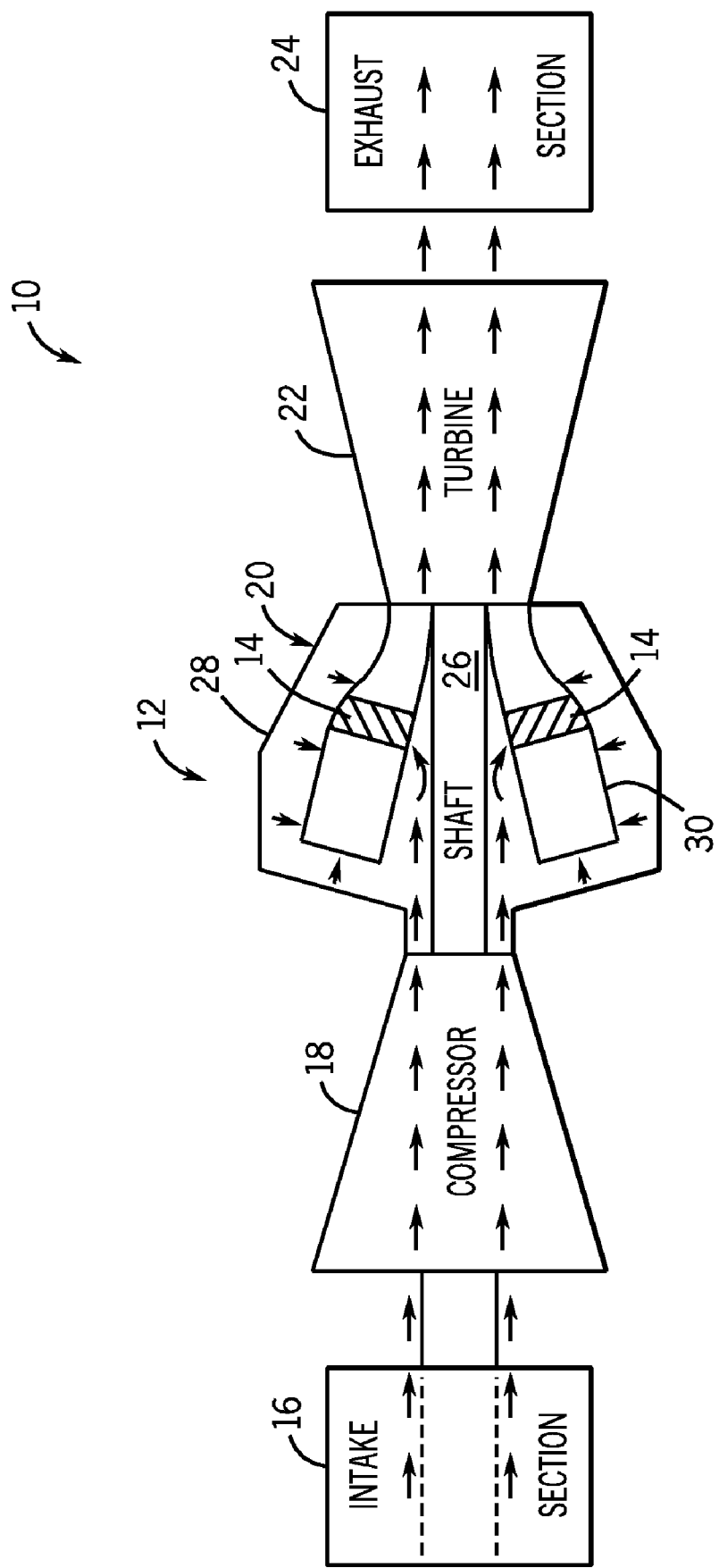
FIG. 1 is a schematic flow diagram of an embodiment of a gas turbine engine with a catalytic reactor that may employ sacrificial coatings.

One or more specific embodiments of the present invention will be described below. In an effort to provide a concise description of these embodiments, not all features of an actual implementation may be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to sacrificial coatings that may be employed in catalytic reactors to protect the catalyst. During certain periods of operation, for example, during startup or commissioning of a combustor within a gas turbine engine or after installation of a new compressor, a higher level of contaminants and/or particulates may be convected downstream to the combustor. These contaminants and/or particulates may flow into the catalytic reactor and may foul or otherwise degrade the catalyst within the reactor. For example, certain particulates may adhere to the catalyst, reducing the surface area available for catalytic interaction during combustion. Accordingly, it may be desirable to apply a sacrificial coating to the catalyst to protect the catalyst during these periods of operation.

The sacrificial coating may be applied during manufacturing or after installation of the catalytic reactor. After the period of operation when desired catalyst protection ends, such as after the first approximately 10 to 1000 operating hours for a new gas turbine engine, the sacrificial coating may be removed. However, the interval for maintaining the sacrificial coating may vary and would be application dependent. Specifically, the sacrificial coating may include a frangible, or easily broken apart, coating that can be chemically removed or mechanically removed while the catalytic reactor is installed within the combustor. For example, the sacrificial coating may include a water-soluble coating that may be removed during a compressor wash. In certain embodiments, the sacrificial coating may be catalytically active to provide catalytic properties while the catalyst is protected. For example, while the sacrificial coating is disposed over the catalyst, the surface area of the catalyst may be concealed, thereby reducing the catalytic benefits. The catalytic properties of the sacrificial coatings may be used to temporarily replace or supplement the catalyst to lower the reaction temperature and reduce emissions while the sacrificial coating is present in the reactor.

In general, the sacrificial coatings may be applied to catalytic reactors within a range of combustion settings, such as gas turbines, engines, and reformers. FIG. 1 illustrates an exemplary application for sacrificial coatings, and depicts a gas turbine engine 12 that may employ catalytic reactors 14 with sacrificial coatings. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is drivingly coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30 where the compressed air may mix and combust with fuel within the catalytic reactors 14. Some or all of the combustion may occur within the catalytic reactors 14, which as discussed above may lower the reaction temperatures to reduce emissions.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24.

Figure 2:
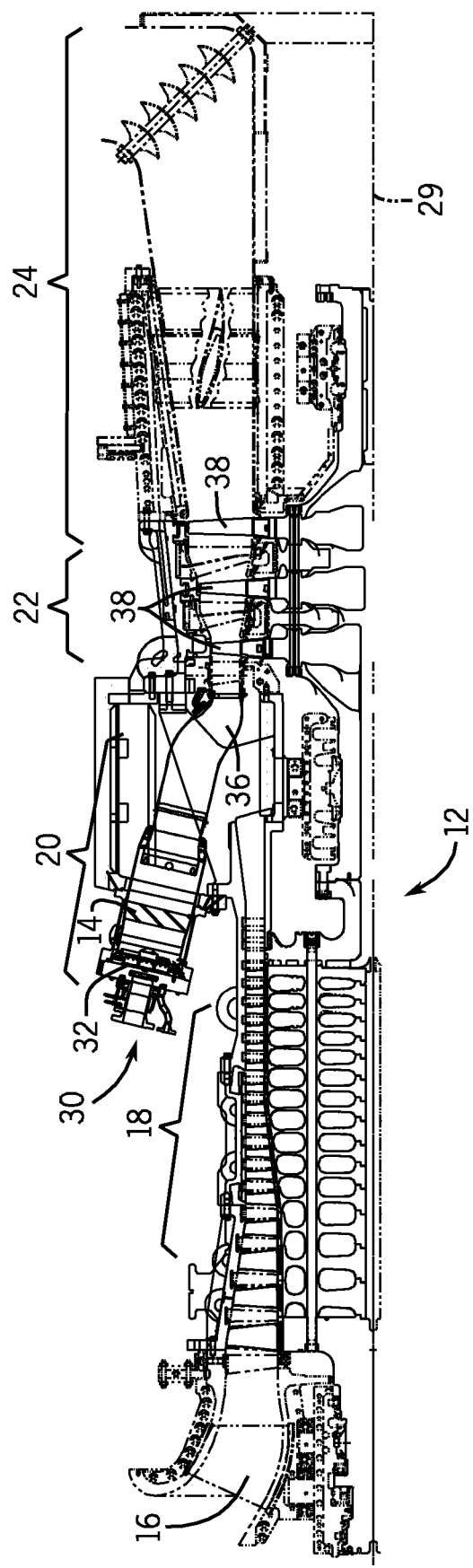
FIG. 2 is a sectional view of an embodiment of the gas turbine engine of FIG. 1 sectioned through the longitudinal axis.

FIG. 2 is a cross-sectional side view of an embodiment of the gas turbine engine 12 of FIG. 1 taken along a longitudinal axis 29. The gas turbine engine 12 includes one or more fuel nozzles 32 located inside the combustor section 20. In certain embodiments, the gas turbine engine 12 may include multiple combustors 30 disposed in an annular arrangement. Further, each combustor 30 may include multiple fuel nozzles 32 attached to the base of each combustor 30 in an annular or other arrangement.

As described above with respect to FIG. 1, air may enter the engine 12 through the air intake section 16 and be compressed by the compressor 18. The compressed air from the compressor 18 may then be directed into the combustor section 20 where the compressed air may be mixed with fuel. For example, the fuel nozzles 32 may inject a fuel-air mixture into the combustors 30 in a suitable ratio for optimal combustion, emissions, fuel consumption, and power output. Within the combustors 30, the fuel-air mixture may combust within the catalytic reactors 14 to generate hot, pressurized exhaust gases. The catalytic reactors 14 may generally include one or more catalysts that lower the reaction temperatures, thereby reducing the creation of undesirable byproducts, such as NOx and carbon monoxide, and/or improving flame stability. Combustion may also occur within the combustors 30 outside of the catalytic reactors 14. The hot pressurized exhaust gases produced by the combustion may exit the combustor section 20 and flow through a transition section 36 to the turbine 22. Within the turbine 22, the pressurized exhaust gases may turn blades 38 that extend radially within the turbine 22 to rotate the shaft 26 (FIG. 1) before exiting through the exhaust section 24.

Figure 3:
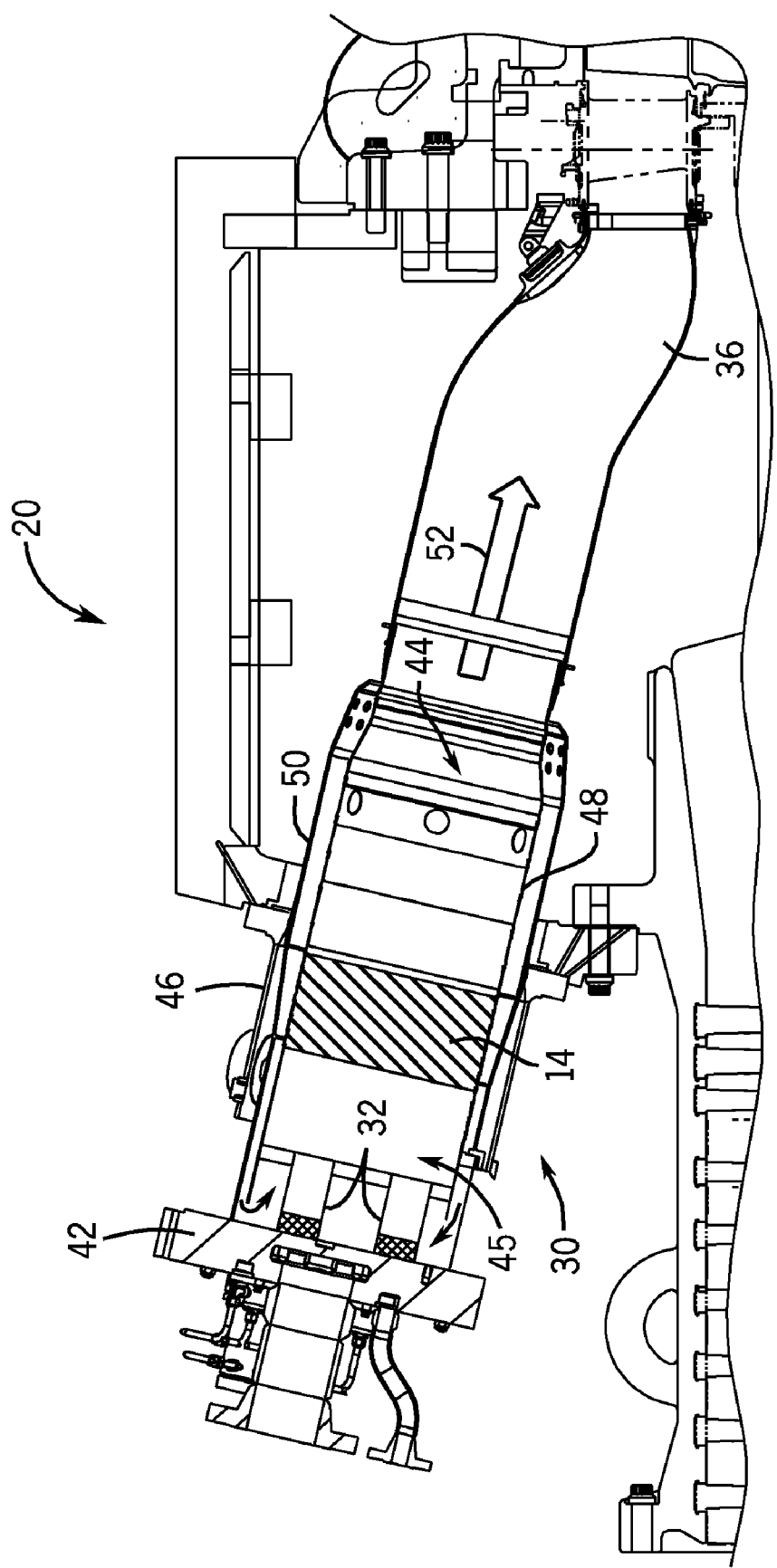
FIG. 3 is a detail view of a portion of the gas turbine engine of FIG. 2 depicting a combustor having the catalytic reactor.

A detailed view of an embodiment of the combustor section 20 is illustrated in FIG. 3. The premixing fuel nozzles 32 are attached to an end cover 42, near a head end of the combustor 30. Compressed fuel is directed through the end cover 30 to each of the fuel nozzles 32, which distribute a premixed air and fuel mixture into the combustor 30. The combustor 30 includes a combustion chamber 44 generally defined by a casing 46, a liner 48, and a flow sleeve 50. In certain embodiments, the flow sleeve 50 may be located coaxially about the liner 48 to direct air from the compressor into the combustion chamber 44 through perforations or other openings in the liner premixing section 45, as generally shown by the arrows.

Fuel nozzles 32 may distribute a pressurize fuel before the catalytic reactor 14 to permit premixing of fuel and air before the catalytic reactor 14. Within combustion chamber 44, the fuel-air mixture may flow through the catalytic reactor 14. The catalytic reactor 14 may generally include a catalyst that accelerates the combustion reactions to produce lower emissions. The catalyst may generally promote stable low temperature reactions of fuel and air to produce combustion exhaust gases 52. From the catalytic reactor 14, the combustion exhaust gases 52 may flow through the main section of the combustion chamber 44 and the transition section 36 where further combustion may occur. For example, partially combusted exhaust gases 52 may undergo thermal combustion within the combustion chamber 44 and/or the transition section 36.

The catalytic reactor 14 may generally include a ceramic or metal substrate coated with a catalyst to form a catalyst bed. The catalyst bed may include any suitable structure, such as honeycombed cells, a packed bed, reticulated foam, a long tube, a monolith, a cylindrical shape, a plate, or the like. The substrate may be composed or fabricated of high temperature materials such as metal alloys, ceramics, metal oxide, intermetallic materials, carbides, nitrides, and the like. The structure of the catalyst bed may generally be coated with a reaction catalyst to accelerate the combustion reactions. For example, the catalyst bed may include a cylinder with a cross-section that includes honeycombed cells coated with a reaction catalyst. The type of catalyst may be specific to the combustion application and may vary based on the type of fuel used. For example, for a hydrocarbon based fuel, the catalyst may include elements such as zirconium, vanadium, chromium, manganese, copper, platinum, osmium, iridium, rhodium, cerium, lanthanum, and other elements of the lanthanide series, copper, nickel iron, magnesium, platinum, and platinum group metals (PGMs). The catalyst also may include other active ingredients of precious metals, group VIII noble metals, base metals, metal oxides, or any combinations thereof.

In other embodiments, the location of the catalytic reactor 14 within the combustor section 20 may vary. For example, the reactor may be generally disposed upstream or downstream of the main combustion chamber 44. Further, the catalytic reactor may be employed in rich or lean combustion environments. Moreover, additional components such as pre-burners, pre-mixers, multiple stages, one or more catalytic pilots or pilot burners, and the like may be included within the combustor section 20. In certain embodiments, the catalytic reactor 14 may be disposed within one of these additional components. For example, the catalytic reactor may be disposed within a rich catalytic reactor, lean catalytic reactor, pre-mixed combustor, catalytic pilot, or pre burner. Further, certain combustors 30 may include multiple catalytic reactors.

Figure 4:
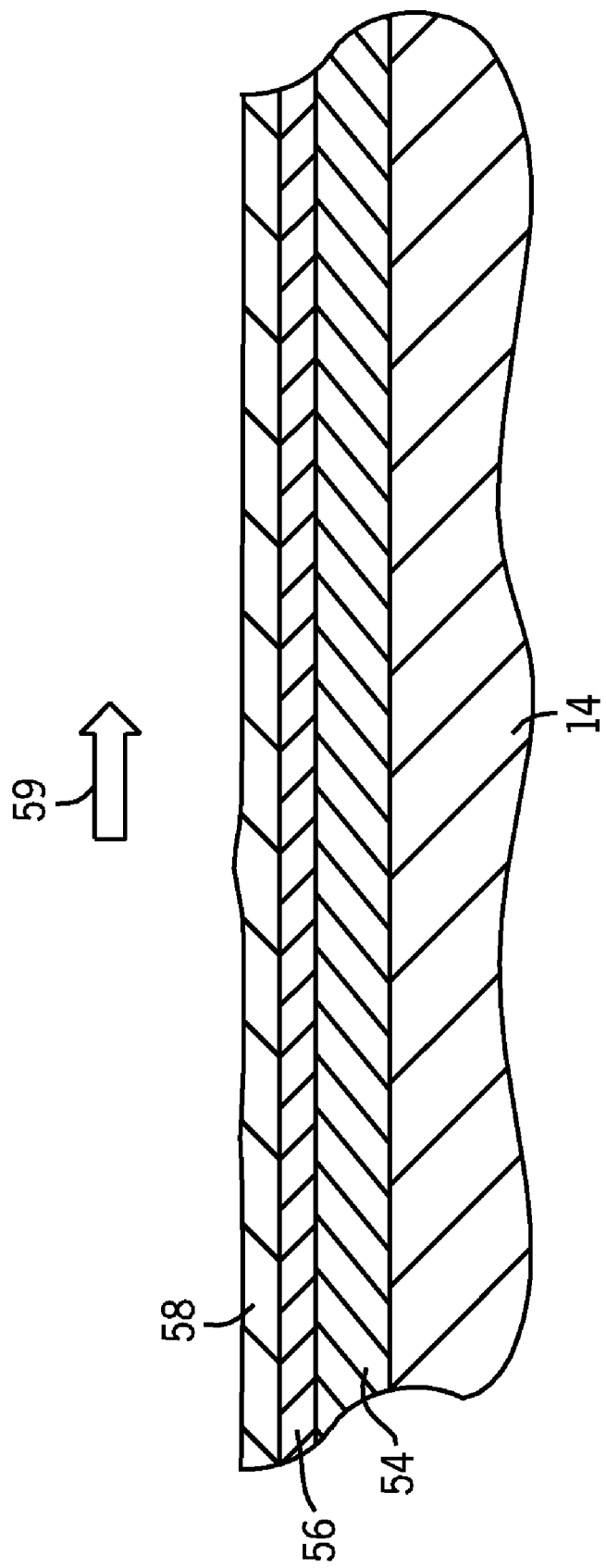
FIG. 4 is a sectional view of a portion of the catalytic reactor shown in FIG. 3 in accordance with certain embodiments.

FIG. 4 is a sectional view through a portion of the catalytic reactor 14 in accordance with certain embodiments. The reactor may generally include a catalytic coating 56 disposed on a substrate 54. As described above with respect to FIG. 3, the catalytic coating 56 may generally accelerate the combustion reaction. For example, for a hydrocarbon-based fuel, the catalytic coating 56 may accelerate the carbon monoxide and hydrocarbon reactions to lower the temperatures needed for the reaction, which in turn may result in lower emissions. As the fuel-air mixture 59 flows through the reactor 14, the fuel-air mixture 59 may pass over the catalytic coating 56 and combust to produce exhaust gases. The fuel-air mixture 59 may include various types of fuels, such as hydrocarbon fuels, non-hydrocarbon fuels (i.e. process gas, refinery gas, syngas, etc.) and mixtures thereof.

During certain periods of combustion, such as startup after an installation, increased levels of particulates and/or contaminates may be transported to the catalytic reactor 14.

These contaminates may attach or adhere to the surface of the catalyst 56 which may foul the catalytic reactor, thereby reducing the catalytic reactor efficiency. Accordingly, a sacrificial coating 58 may be disposed as a protective coating over the catalyst 56 during these periods of operation. For example, the sacrificial coating 58 may be disposed over the catalyst 56 during the initial start up of the turbine engine, or after replacement of certain pieces of equipment, such as the air compressor or fuel supply system. In certain embodiments, the catalytic reactor 14 may be provided by the manufacturer with the sacrificial coating 58 in place so that it may be utilized upon start up of the combustor. However, in other embodiments, the sacrificial coating 58 may be applied after the catalytic reactor 14 has been installed within a combustor. Moreover, the sacrificial coating 58 may be applied in one or more coatings or layers over the catalytic coating 56 and may be replenishable without removal of the catalytic reactor 14 to allow protection as desired in the future.

The sacrificial coating 58 may generally inhibit damage to the catalyst 56 by providing a protective layer over the catalyst 56. In certain embodiments, the sacrificial coating 58 may form a physical bond with the catalyst 56. The sacrificial coating 58 may include any suitable frangible, easily broken apart, coating that may be chemically removed or mechanically removed while the reactor is installed within the combustor. For example, the coating may be chemically removed using a simple solvent, such as water, alcohol, ethanol, ethylene glycol, degreasers, detergents, or the like. The coating also may be mechanically removed by the application of mechanical forces, such as ultrasonic vibrations and mechanical impact among others. For example, walnut shells may be directed through the catalytic reactor 14 to break apart the sacrificial coating 58. The fragmented pieces of the sacrificial coating 58 may then be flushed out of the reactor 14, for example, during a compressor wash cycle. Regardless of the removal method, the sacrificial coating 58 may be generally removable without damaging the underlying catalyst 56. Further, the sacrificial coating 58 may be removable without disassembly of the combustor components.

In certain embodiments, the sacrificial coating 58 may be disposed on other sections of the catalytic reactor 14 in addition to the catalyst 56. For example, the sacrificial coating 58 may be applied to parts of the liner 48, which may provide a thermal barrier during start up or other operations. The sacrificial coating may be removed from other sections of the reactor 14 during removal of the sacrificial coating 58 from the catalyst 56.

The sacrificial coating 58 may include any suitable type of coating, such as a metal oxide coating, organic coating, or other frangible coating that is chemically or mechanically removable. For example, a metal oxide coating may include combinations of magnesium and oxygen, such as magnesium sulfonate that may be removed using an oil based solvent or magnesium sulfate that may be removed using a water based solvent. In another example, an organic coating may be employed to form an oxygen barrier that may be removed during oxidation or thermally volatized. In certain embodiments, the sacrificial coating 58 may include commercially available coatings such as Pepto-Bismol® commercially available from Proctor and Gamble of Cincinnati, Ohio or Teflon® commercially available from DuPont of Wilmington, Del. In other embodiments, the coating may include milk of magnesia, magnesia hydroxide, or bismuth subsalicylate solutions. In certain embodiments, the sacrificial coating 58 may be comprised of relatively stable and environmentally friendly compounds to abate environmental concerns upon removal of the sacrificial coating 58.

In certain embodiments, the use of a magnesium-based coating may provide additional catalytic properties to the sacrificial coating 58. The catalytic properties may allow the sacrificial coating 58 to accelerate the combustion reaction when the sacrificial coating is disposed on the catalyst 56. For example, the sacrificial coating 58 may be disposed on the catalyst 56 during initial startup of the gas turbine engine 12 (FIG. 1). As shown in FIG. 4, the sacrificial coating 58 may be disposed over the catalyst so that the combustion gases 52 are unable to contact the catalyst 56. However, the combustion gases 52 may contact the sacrificial coating 58 and the catalytic properties of the sacrificial coating 58 may function to accelerate the combustion reaction, thereby reducing emissions when the sacrificial coating 58 is disposed within the reactor 14. In other embodiments, the coating may be doped with a catalyst. For example, the coating may be doped with a platinum group metal, such as ruthenium, rhodium, palladium, osmium, iridium, and platinum. In certain embodiments, Pepto-Bismol® may be doped with a catalyst to enhance the catalytic properties of the sacrificial coating 58. In other embodiments, other doping agents with catalytic properties, such as iron, cobalt, or nickel, may be employed.

Figure 5:
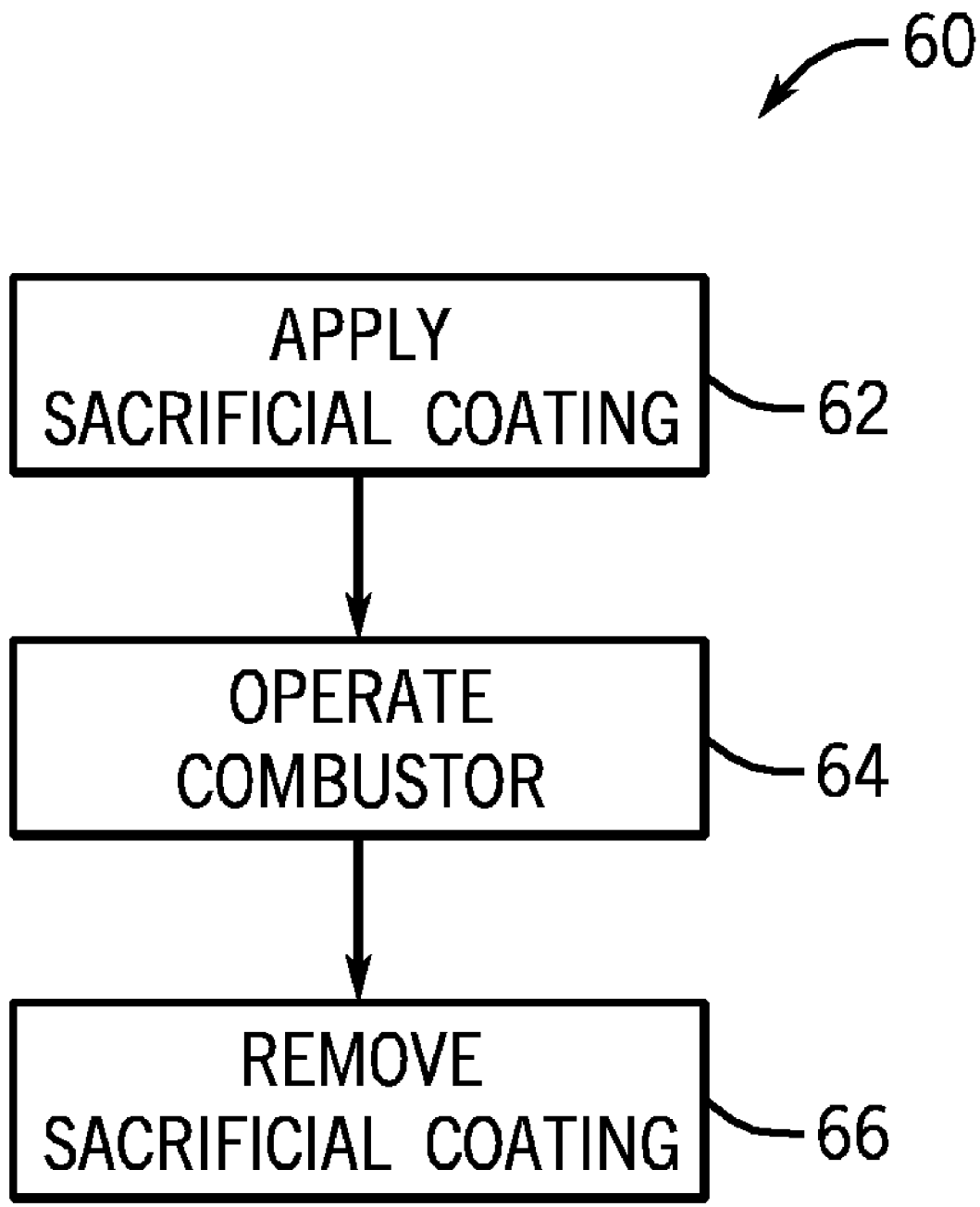
FIG. 5 is a flow chart depicting an exemplary method for employing a sacrificial coating.

As noted above, the sacrificial coating 58 may be temporarily disposed over the catalyst to protect the catalyst during periods of operations when the catalyst may be prone to damage from contaminates and/or particulates. FIG. 5 depicts an exemplary method 60 for employing a sacrificial coating in a catalytic reactor. The method may begin by applying (block 62) the sacrificial coating to the catalyst. In certain embodiments, the sacrificial coating 58 (FIG. 4) may be applied by the manufacturer during assembly of the catalytic reactor 14 (FIG. 4). For example, the sacrificial coating 58 may be sprayed onto the catalyst using a type of masking application or the sacrificial coating 58 may be applied through other methods such as spraying, brushing, dipping, and the like. In other embodiments, the sacrificial coating 58 may be applied after the reactor has been installed within a combustor. For example, after overhaul of a gas turbine engine or installation of a new compressor, the sacrificial coating 58 may be applied (e.g., by spraying, brushing, and the like) through an opening in catalytic reactor 14. In certain embodiments, the housing 28 (FIG. 1) of the combustor 30 may include an access opening for application of the sacrificial coating. In other embodiments, the sacrificial coating 58 may be applied by addition to the fuel system or upstream compressor wash system. During application, the sacrificial coating 58 may be disposed on the catalyst 56 as well as other areas of the combustor 30 (FIG. 3), such as the combustion liner 48 (FIG. 3). After application, a drying period may occur, and in certain embodiments, the gas turbine engine may be engaged to provide heat to facilitate the drying process.

After application of the sacrificial coating, the method may continue by operating (block 64) the combustor for a set period. The period may be based on a variety of factors, such as manufacturer recommendations, the type of installation, manufacturing considerations, and the like. For example, during startup of a gas turbine engine, the combustor may be operated for approximately ten to two hundred and fifty hours, and all subranges therebetween. More specifically, the combustor may be operated for approximately fifty to one hundred and fifty hours. During this period, loose particulates and contaminates may flow through the gas turbine engine. In another example, the combustor may be operated after replacement of a compressor for approximately two hundred hours.

After the period has passed, the sacrificial coating 58 may be removed (block 66). The removal process may take place while the catalytic reactor and the combustor are housed within the gas turbine engine. For example, if the sacrificial coating is water soluble, the sacrificial coating may be dissolved during testing of the compressor wash system using an engine water wash. In another example, a detergent or other simple solvent may be directed through the combustor to remove the sacrificial coating. In certain embodiments, after use of a simple solvent other than water, a water wash may be performed to flush any remaining solvent from the combustor. In another example, ultrasonic vibrations or a gas pressure pulse (i.e., a shockwave, etc.) may be applied to the combustor to break up the sacrificial coating. After vibration or other mechanical removal, a water wash may be applied to flush the fragments of the sacrificial coating from the combustor and the engine.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    a combustor; and
    a catalytic reactor comprising a catalyst underlying a protective coating disposed over the catalyst to inhibit fouling of the catalyst during combustion, wherein the protective coating is removable while the catalytic reactor is disposed in the combustor by a chemical removal, a mechanical removal, or both, wherein the protective coating is removable without damaging the catalyst disposed in the catalytic reactor, and wherein the protective coating comprises a magnesium hydroxide suspension, bismuth subsalicylate, magnesium sulfonate, or magnesium sulfate.

2. The system of claim 1, wherein the protective coating comprises a water soluble coating removable during a compressor wash.

3. The system of claim 1, wherein the protective coating is catalytically active.

4. The system of claim 1, wherein the catalyst is disposed on a catalyst bed of at least one of honeycombed cells or tubular structures within the catalytic reactor, and wherein the protective coating is disposed as a layer over the catalyst.

5. The system of claim 1, wherein the catalyst is configured to reduce NOx emissions during combustion.

6. The system of claim 1, comprising a turbine, a compressor, a turbine engine, or combinations thereof.

7. The system of claim 1, wherein the catalytic reactor is disposed within a preburner of the combustor, disposed within a pilot burner of the combustor, disposed within a premixer of the combustor, or disposed within a main combustion chamber of the combustor.

8. A method, comprising:
    operating a combustor;
    removing a protective coating to reveal a catalyst within a catalytic reactor of the combustor while the catalytic reactor is disposed within the combustor, wherein the protective coating is removed from the catalytic reactor without damaging the catalyst disposed in the catalytic reactor, and wherein the protective coating comprises a magnesium hydroxide suspension, bismuth subsalicylate, magnesium sulfonate, or magnesium sulfate.

9. The method of claim 8, wherein operating the combustor comprises combusting a non-hydrocarbon based fuel within a gas turbine engine.

10. The method of claim 8, wherein operating the combustor comprises commissioning a gas turbine engine after an engine overhaul, fuel system overhaul, or an initial installation.

11. The method of claim 8, wherein removing the protective coating comprises directing a solvent through the catalytic reactor to dissolve the protective coating.

12. The method of claim 8, wherein removing the protective coating comprises applying at least one of ultrasonic vibrations or a gaseous pressure wave to the catalytic reactor.

13. The method of claim 8, wherein operating the combustor comprises operating a gas turbine engine during an initial startup period ranging from approximately 10 hours to 250 hours prior to removing the protective coating.

14. The method of claim 8, wherein the protective coating comprises bismuth subsalicylate doped with a platinum group metal.

15. A method, comprising:
    applying a protective coating over a catalyst coating within a catalytic reactor, wherein the protective coating is configured to be removed while the catalytic reactor is disposed within a combustor, wherein the protective coating is configured to be removed without damaging the catalyst coating disposed in the catalytic reactor, and wherein the protective coating comprises a magnesium hydroxide suspension, bismuth subsalicylate, magnesium sultanate, or magnesium sulfate, 16. The method of claim 15, comprising removing the protective coating to reveal the catalyst coating.

17. The method of claim 15, wherein applying the protective coating comprises spraying a metal oxide coating over the catalyst coating.

18. The method of claim 15, wherein applying the protective coating comprises adding the protective coating to the catalytic reactor through a fuel system of the combustor or through a compressor wash upstream of the combustor, 19. The method of claim 15, wherein applying the protective coating comprises coating a liner of the combustor, 20. The system of claim 1, wherein the catalyst comprises a catalyst coating, and wherein the protective coating is removable without damaging the catalyst coating.

21. The system of claim 1, wherein the protective coating is removable without damaging the catalytic reactor.

* * * * *